United States Patent Office.

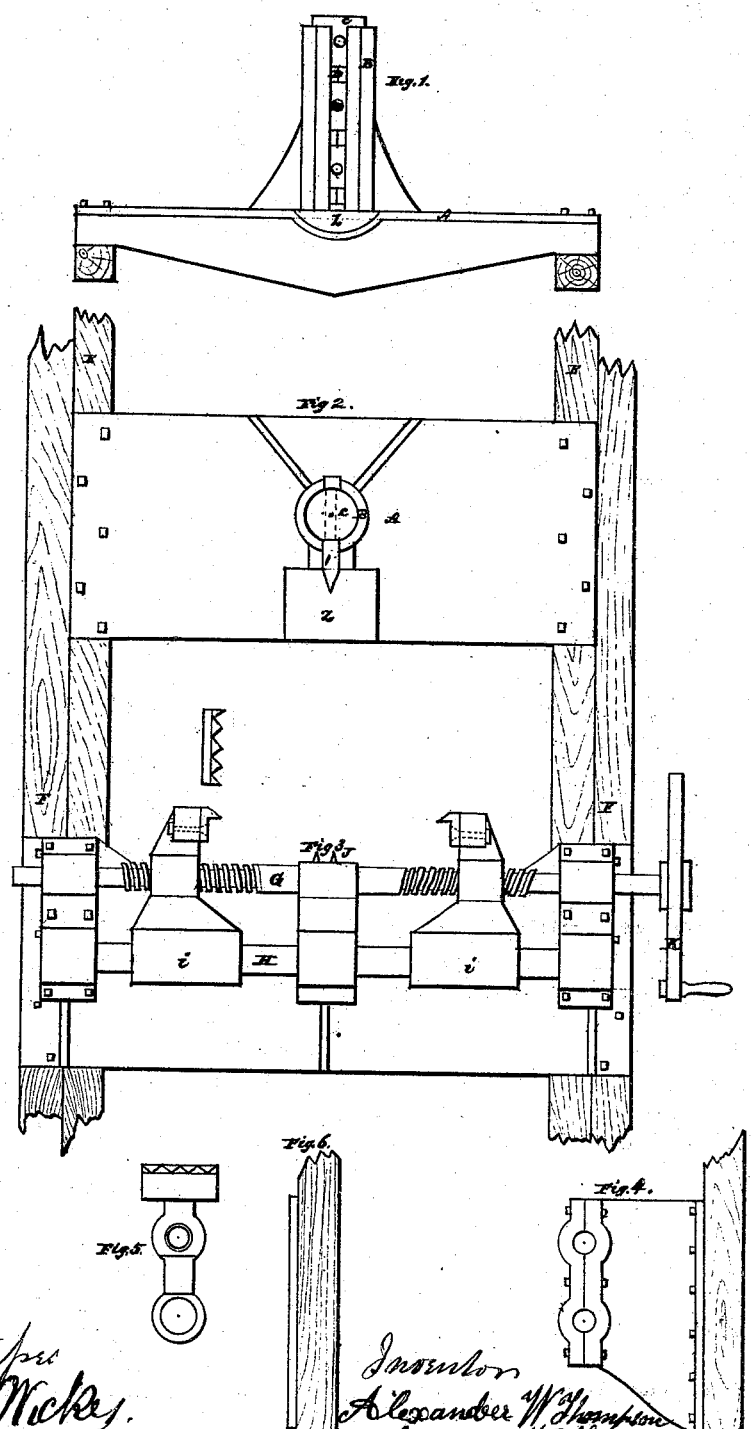

ALEXANDER W. THOMPSON, OF SAGINAW, MICHIGAN, FOR HIMSELF, AND AS ADMINISTRATOR OF THE ESTATE OF HENRY THOMPSON, DECEASED.

Letters Patent No. 98,528, dated January 4, 1870.

IMPROVEMENT IN HEAD-BLOCKS FOR SAW-MILLS.

The Schedule referred to in these Letters Patent and making part of the same.

*To all whom it may concern:*

Be it known that HENRY THOMPSON, deceased, late of the city and county of Saginaw, State of Michigan, and ALEXANDER W. THOMPSON, the undersigned, of the city and county of Saginaw, State of Michigan, invented a new Mode of Holding Logs with Head-Blocks; and I, ALEXANDER W. THOMPSON, for myself, and as executor of the last will and testament of HENRY THOMPSON, deceased, do declare that the following is a full and exact description thereof, reference being had to the accompanying drawings, and to the letters of reference marked thereon.

The nature of the invention consists in holding round and flat logs for gang-saws, alternately, without any change of parts or delay.

Figure 1 is an end view of head-block, and

Figure 2 is a top or plan view of head-block.

A is the head-block, with upright cylinder B, in which is an inside cylinder, C, containing the round and square dogs D. This cylinder has only a perpendicular movement to allow for irregularities of the log.

This head-block is attached to the inside carriage E.

Z is a circular recess in the bed-plate for the log to rest in.

Figure 3 represents a similar bed-plate for tail-block, resting on the outside carriage F, with a vertical bracket, as shown in Figure 4, forming a bearing for the right and left-hand screw, G, and parallel rod, H, supporting-dogs *i i*, the centre or stationary dogs J, on centre brackets holding the log in direct line with saws, when the hand-wheel K is turned, and the dogs *i i* clamped upon the log in any position it may occupy, as the screw has a lateral motion in its bearings.

Figure 5 is a section of dogs *i i*.

Figure 6 is a section of plate and carriage.

What I claim as our invention, and desire to secure by Letters Patent, is—

The combination of the head-block A, with the upright cylinder B, and inside cylinder C, containing the round and square dogs D D, when all the parts are constructed and operate substantially as shown and described.

ALEXANDER W. THOMPSON.

Witnesses:
C. H. GAGE,
E. N. WICKES.